United States Patent
Smith et al.

(10) Patent No.: US 10,019,556 B2
(45) Date of Patent: Jul. 10, 2018

(54) EPID ATTESTATION USING RFID

(71) Applicant: McAfee, LLC, Santa Clara, CA (US)

(72) Inventors: Ned Smith, Beaverton, OR (US); Sven Schrecker, Santa Clara, CA (US); Willard Wiseman, Tigard, OR (US); David Clark, Santa Clara, CA (US); Jennifer Gilburg De Magnin, Santa Clara, CA (US); Howard Herbert, Phoenix, AZ (US)

(73) Assignee: McAfee, LLC, Santa Clara, CA (US)

( * ) Notice: Subject to any disclaimer, the term of this patent is extended or adjusted under 35 U.S.C. 154(b) by 17 days.

(21) Appl. No.: 14/757,398

(22) Filed: Dec. 23, 2015

(65) Prior Publication Data

US 2017/0185814 A1    Jun. 29, 2017

(51) Int. Cl.
| | | |
|---|---|---|
| *G06F 21/00* | (2013.01) | |
| *G06K 7/10* | (2006.01) | |
| *H04L 9/08* | (2006.01) | |
| *G06Q 10/10* | (2012.01) | |
| *G06Q 50/10* | (2012.01) | |

(52) U.S. Cl.
CPC ......... *G06F 21/00* (2013.01); *G06K 7/10257* (2013.01); *G06Q 10/10* (2013.01); *H04L 9/0819* (2013.01); *G06Q 50/10* (2013.01); *G06Q 2220/00* (2013.01)

(58) Field of Classification Search
None
See application file for complete search history.

(56) References Cited

U.S. PATENT DOCUMENTS

| | | |
|---|---|---|
| 2008/0270790 A1 | 10/2008 | Brickell et al. |
| 2010/0161999 A1 | 6/2010 | Poovendran |
| 2012/0023334 A1* | 1/2012 | Brickell ............... H04L 9/0844 |
| | | 713/169 |
| 2014/0032907 A1 | 1/2014 | Smith et al. |
| 2015/0002260 A1 | 1/2015 | Brown |

FOREIGN PATENT DOCUMENTS

WO      2015/088533      6/2015

OTHER PUBLICATIONS

International Search Report and Written Opinion for PCT Patent Application No. PCT/US2016/063553, dated Mar. 13, 2017; 14 pages.

* cited by examiner

*Primary Examiner* — Daniell L Negron
(74) *Attorney, Agent, or Firm* — Byrne Poh LLP

(57) ABSTRACT

Technologies for verification include storage with private keys, wherein each private key is associated with a group affiliation. The storage also includes characteristic information about an apparatus. The technologies also include a wireless interface configured to receive a request from a reader for verification of membership of the apparatus within a group affiliation. The technologies further include a controller with programmable logic for configuring the controller to determine whether to verify membership of the apparatus within a given group affiliation. The controller is also configured to verify membership of the apparatus within the given group affiliation by signing data with a private key associated with the given group affiliation. The signed data is sent to the reader. Membership within the given group affiliation conveys a subset of the characteristic information.

16 Claims, 5 Drawing Sheets

US 10,019,556 B2

EPID ATTESTATION USING RFID

TECHNICAL FIELD OF THE INVENTION

Embodiments of the present invention relate generally to security and distributed computing and, more particularly, to enhanced privacy identification attestation using radio frequency identification.

BACKGROUND

Enhanced Privacy Identification (EPID) is a digital signature scheme. A group public key in EPID corresponds to multiple private keys. A private key can be used to generate a signature. The signature can be verified using the group public key.

EPID is an extension of Direct Anonymous Attestation (DAA). DAA is a cryptographic scheme for providing anonymous signatures. DAA is used for the Trusted Platform Module created by the Trusted Computing Group.

A feature of EPID is that keys issued can be blind. The issuer need not know a member's private key. The EPID signatures are anonymous. The EPID signature cannot be opened to identify the member. The linkability of an EPID signature and members of a group depend upon the base values that are chosen and revealed during the signature. Signatures using a common name verifier can be linked. A signature using a random base name cannot be linked across bases but can be linked within the same base name. Signatures using different base name verifiers cannot be linked. EPID signatures, private keys, and public keys can be revoked.

Radio frequency identification (RFID) includes the wireless use of electromagnetic fields to transfer data. RFID may be implemented through RFID tags that report information to RFID readers.

BRIEF DESCRIPTION OF THE DRAWINGS

For a more complete understanding of embodiments of the present invention and its features and advantages, reference is now made to the following description, taken in conjunction with the accompanying drawings, in which.

DETAILED DESCRIPTION

Figure 1:
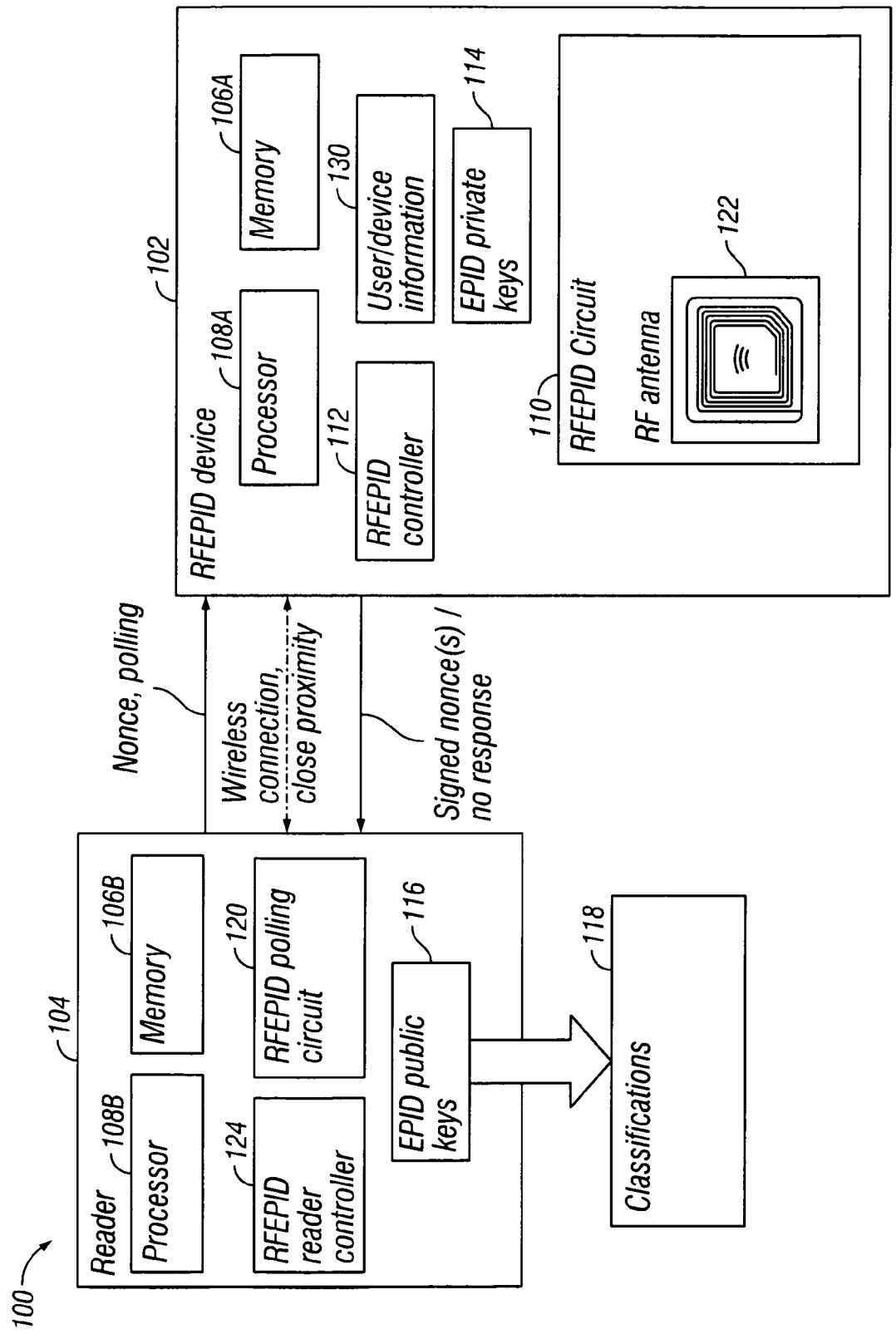
FIG. 1 is an illustration of an example embodiment of a system for peer-aware self-regulation for virtualized environments.

FIG. 1 is an illustration of an example embodiment of a system 100 for enhanced privacy identification (EPID) attestation using radio frequency identification (RFID). A device that utilizes both EPID and RFID with embodiments of the present disclosure may be referred to as an RFEPID device. In one embodiment, system 100 may include an RFEPID device 102 and a reader 104. Reader 104 may be configured to verify the status, classification, characteristics, or identity of RFEPID device 102. The verified status, classification, characteristics, or identity of RFEPID device 102 may be used by a user of reader 103 to authenticate a user of RFEPID device 102. RFEPID device 102 may implement or be implemented in, for example, personal documents, travel documents, Internet-of-Things device, appliances, fobs, keycards, passports, credit cards, identity cards, laptops, tablets, mobile devices, or other suitable devices. Verified status may be used to provide physical, electronic, automatic, or other sorts of access, or to give authorization to electronic processes.

RFID may include a wireless data exchange protocol. The proximity of an RFID reader and an RFID device may be the basis for an attempted connection between the reader and device. Variants and evolutions of RFID may be used, such as near-field communication (NFC) for the present disclosure.

EPID may include a verification protocol that uses key-pairs. With EPID, a same public key may be used to verify digital signatures produced by one of many different members of a group or set. Each member of the group or set may have been issued a unique private key. While each member of the group may uniquely produce a digital signature, the digital signature may be verified by consumers or readers of the digital signature with the public key. However, the unique identity of a given member of the group might not necessarily be communicated by merely signing with its private, unique EPID key. In one embodiment, RFEPID device 102 may implement EPID through the ability to provide signatures of data using private EPID keys of any suitable number of groups.

RFEPID device 102 may be implemented in any suitable manner. RFEPID device 102 may be implemented as a wearable device, a system-on-chip, or other suitable form factor. The logic, routines, instructions, circuitry, modules, or other components that configure the operation and execution of RFEPID device 102 may be implemented in an application specific integrated circuit (ASIC) or a field-programmable gate array (FPGA). The logic, routines, instructions, modules, or other components that configure the operation and execution of RFEPID device 102 may be stored in a computer-readable medium (such as memory 106A) and executed by a processor 108A in RFEPID device 102 to configure RFEPID device 102 to perform the functionality described in this disclosure. In some examples, the memory and processor may be integrated within an ASIC or FPGA. In one embodiment, RFEPID device 102 may include an RFEPID circuit 110. RFEPID circuit 110 may include an RFID circuit. RFEPID circuit 110 may be included in processor 108A or communicatively coupled to processor 108A. EPID operations, interfacing with RFEPID circuit 110, and other functionality of RFEPID device 102 may be performed by RFEPID controller 112. RFEPID controller 112 may include circuitry, logic, routines, instructions, modules, or other suitable mechanisms to configure part of the operation of RFEPID device 102. RFEPID controller 112 may include circuitry to sign using EPID signatures. These may be written to circuitry in the ASIC or FPGA, or may be stored in memory 106A, as appropriate. RFEPID controller 112 may include programmable logic, embodied in, for example, instructions to be loaded for execution by processor 109 or circuitry written to an ASIC or FPGA.

In some embodiments, RFEPID device 102 may include a battery or other power source. Other EPID-based devices require such a battery or other power source. In other embodiments, RFEPID device 102 may be powered through RFEPID circuit 110. RFEPID circuit 110 may in turn be powered externally and wirelessly through induction or other mechanisms when, for example, RFEPID circuit 110 is within range of an RFID reader.

RFEPID circuit 110 may include an RF antenna 122. RF antenna 122 may be implemented in any suitable manner. RF antenna 122 may receive an RF signal one channel and transmit on a second channel. Reception of the RF signal may be made when RFEPID device 102 moves into close proximity to reader 104. Reception of the RF signal may power RFEPID device 102. The RF signal may include a nonce generated by reader 104, which may be polling for RFID devices. The nonce may include a random number or transaction identifier. Furthermore, reception of the RF signal may cause RFEPID device 102 to sign the nonce. In one embodiment, the signature may be made with one of several EPID private keys 114 stored on RFEPID device 102. These keys may have been assigned to RFEPID device 102 based upon the device or a user of the device being a member of a defined group or having a certain classification.

When the signed nonce is returned to reader 104, reader 104 may verify the signature with an associated public EPID key 116. The EPID key 116 that verifies the signature will verify the group affiliation, group membership, or classifications 118 of RFEPID device 102.

Reader 104 may be implemented in any suitable manner. Reader 104 may include a processor 108B communicatively coupled to a memory 106B. Memory 106B may include instructions that, when loaded into processor 108B and executed, configure reader 104 to perform the functionality described in this disclosure. Reader 104 may include an RFID polling circuit 120, configured to poll for RFEPID devices and RFID devices. RFID polling circuit 120 may include an RFID circuit. Reader 104 may include an RFEPID reader controller 124 to find and verify keys, as well as perform other EPID functions for reader 104. RFEPID reader controller 124 may be implemented by circuitry, instructions in memory 106B for execution by processor 108B, programmable logic, or other suitable mechanisms.

In one embodiment, RFEPID device 102 may be included in multiple groups, classifications, or affiliations. In another embodiment, such groups, classifications, or affiliations may be discrete, composite of, or nested within other groups, classifications, or affiliations. The particular signature created from a given EPID private key 114 may specify which level of a nested group, classification, or affiliation to which RFEPID device 102 belongs.

In one embodiment, RFEPID device 102 may receive polling from reader 104 and determine the identity, privacy, classification, or other characteristics of reader 104. In another embodiment, RFEPID device 102 may receive polling from reader 104 and identify device or user information 130 that is to be used or requested by reader 104. Such information may include information to be derived from or contained within the groups, classifications, or affiliations of RFEPID device 102.

In one embodiment, RFEPID device 102 may selectively choose from EPID private keys 114 to sign the nonce based upon a desired level of sharing information with reader 104. In another embodiment, RFEPID device 102 might not sign the nonce with any of EPID private keys 114, in order to prevent identification of any of its groups, classifications, or affiliations to reader 104. In such a case, RFEPID device 102 might not sign the nonce at all. RFEPID device 102 may selectively choose to sign the nonce with a given one of EPID private keys 114 to identify RFEPID device 102 as including the group, classification, or affiliation associated with the EPID private key 114. The decision of which group, classification, or affiliation may be based upon the information requested from reader 104. Furthermore, the decision may be based upon a desired level of privacy, wherein the minimum amount of information necessary to successfully interface with reader 104 for a given task may be specified, while withholding other possible information. In different or nested groups, classifications, or affiliations (each with its own EPID private key 114), different subsets of information 130 may be made available. Some portions of information 130 may be withheld altogether.

In one embodiment, when RFEPID device 102 is to sign the nonce and return it to reader 104, RFEPID device 102 may include additional information to reader 104 to identify which key to use or which group, classification, or affiliation will be verified through the signature of the nonce. Such additional information may be included in a packet, the same transmission, a header, or any other suitable mechanism. The additional information may allow reader 104 to efficiently select the corresponding one of EPID public keys 116 to verify the signature made by one of EPID private keys 114. Otherwise, reader 104 would have to infer the key, or try multiple keys for verification.

In another embodiment, reader 104 may supply a base name value corresponding to a branch of a classification group to which RFEPID device 102 may belong. For example, if a group is defined as consisting of residents of West Carolina or the group of pre-check members (e.g., WC-or-PC), then a signature using an EPID key corresponding to this group would reveal membership in the WC-PC group. If reader 104 wishes to further refine group memberships, rather than requiring the holder of RFEPID device 102 to maintain second or third EPID keys (for the various permutations of groups), the WC-PC key may be used to sign a verifier supplied base name "WC" or "PC"—respectively. By signing with the supplied sub-group basename, RFEPID device 102 acknowledges membership in the subgroup. If reader 104 engages in a sequence of signing operations beginning with a top-level group (e.g. "WC-or-PC"), RFEPID device 102 may remain anonymous within the larger group. If reader 104 wishes to further refine group membership, reader 104 may select a second basename of a sub-group (e.g. "PC") to determine if RFEPID device 102 is willing to disclose membership in the subgroup. The process may be repeated for various branches and subtrees of a composite group. RFEPID device 102 might stop providing signatures when, for example, a group membership is too revealing from a privacy or security perspective for RFEPID device 102 or its users.

The prover will stop supplying signatures when a group membership is too revealing from a privacy perspective.

In one embodiment, when RFEPID device 102 is to sign the nonce and return it to reader 104, RFEPID device 102 may include additional information to reader 104 to indicate that additional signatures, reflecting additional groups, classifications, or affiliations, will be provided. The additional information may be provided through any suitable mechanism. In another embodiment, reader 104 may poll RFEPID device 102 a second time, unprompted, in case RFEPID device 102 will provide additional signatures to reflect the additional groups, classifications, or affiliations.

RFEPID device 102 may identify the group, classification, or affiliation to be signed through a group number or identifier. Reader 104 may take the identifier, look it up in a database, retrieve a certificate for the group, and access the public key from the certificate.

Processors of system 100, including processor 108, may include a signal processor (DSP), application specific integrated circuit (ASIC), or any other digital or analog circuitry configured to interpret and/or execute program instructions and/or process data. In some embodiments, processor 108 may interpret and/or execute program instructions and/or process data stored in memory 106. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable storage media).

Figure 2:
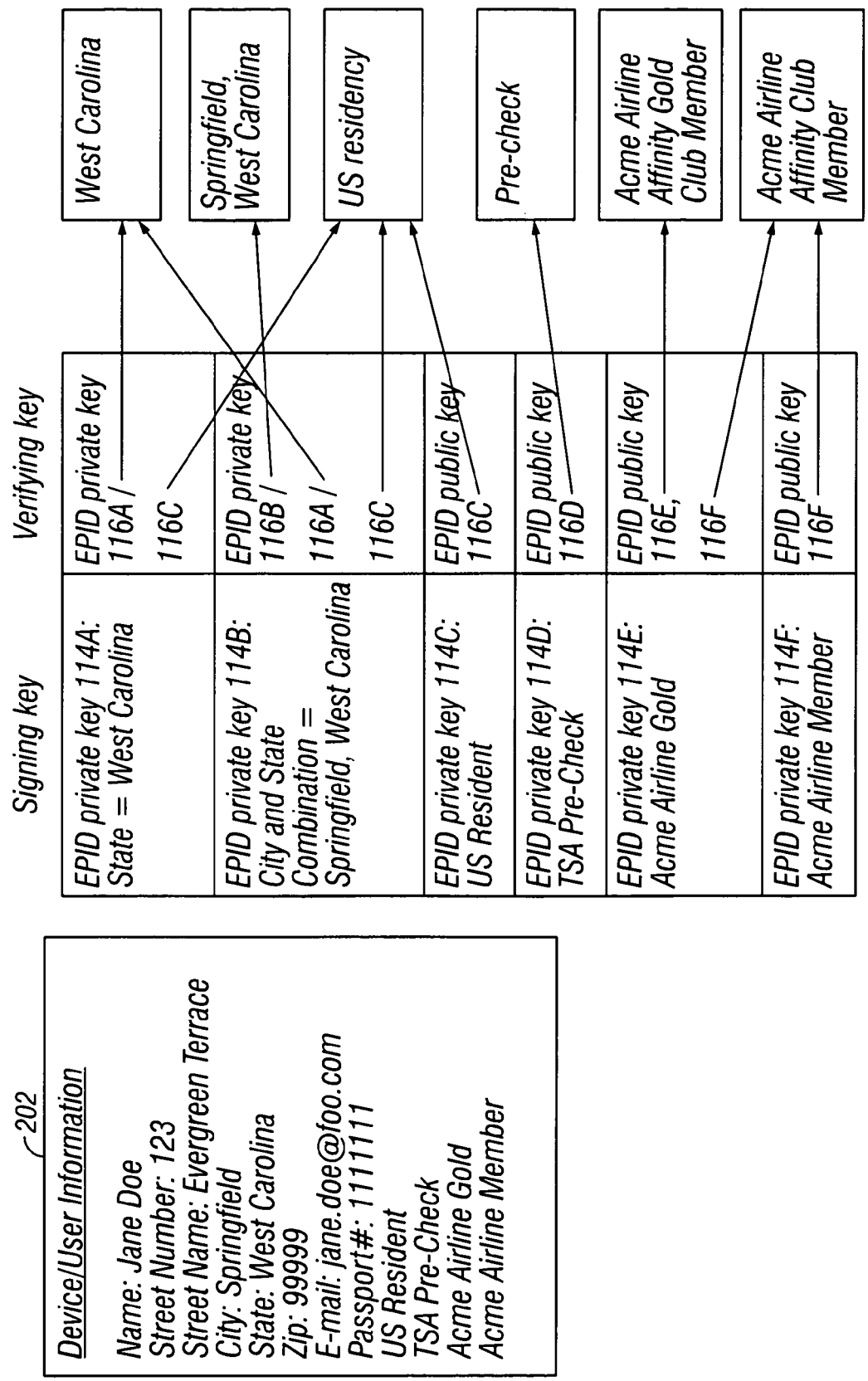
FIG. 2 is an illustration of example operation of a system for virtual machines to discover peer virtual machines on the same electronic device.

Processor 108 may execute one or more code instruction(s) to be executed by the one or more cores of the processor. The processor cores may follow a program sequence of instructions indicated by the code instructions. Each code instruction may be processed by one or more decoders of the processor. The decoder may generate as its output a micro operation such as a fixed width micro operation in a predefined format, or may generate other instructions, microinstructions, or control signals which reflect the original code instruction. Processor 108 may also include register renaming logic and scheduling logic, which generally allocate resources and queue the operation corresponding to the convert instruction for execution. After completion of execution of the operations specified by the code instructions, back end logic within processor 108 may retire the instruction. In one embodiment, processor 108 may allow out of order execution but requires in order retirement of instructions. Retirement logic within processor 108 may take a variety of forms as known to those of skill in the art (e.g., re-order buffers or the like). The processor cores of processor 108 are thus transformed during execution of the code, at least in terms of the output generated by the decoder, the hardware registers and tables utilized by the register renaming logic, and any registers modified by the execution logic FIG. 2 illustrates example information that may be assigned to different groups, classifications, or affiliations for a given device, according to embodiments of the present disclosure. While a certain number of examples are provided, any suitable combination of groups, classifications, or affiliations may be selectively derived from given information 130 from an RFEPID device 102 according to the specific intended function of RFEPID device 102.

RFEPID device 102 might be presented to an instance of reader 104 to gain access to an airline lounge, or to enter within a given security check line at an airport. To enter the airline lounge, the status with respect to the airline affinity club might need to be checked. However, all other information might not be relevant. To enter a given security check line at the airport, the status with respect to pre-check or the particular status within the airline affinity club may be sufficient. However, all other information might not be relevant.

For example, information 202 may be stored on an instance of RFEPID device 102 and may include information about a traveler. Information 202 might include information about the name, street number, street name, state, zip code, e-mail address, passport number, US residency, Travel and Safety Administration pre-check status, an airline affinity club membership, and a particular status within the airline affinity club.

An instance of pairs of EPID private keys 114 and EPID public keys 116 might exist for one or more sets of such information. For example, EPID private key 114A may, when signing a nonce, indicate that information 202 discloses a given state of West Carolina.

EPID private key 114A may, when signing a nonce, indicate that information 202 discloses a given state of West Carolina. EPID public key 116A may verify that a signature made with EPID private key 114A was valid, and that the user of RFEPID device 102 is a member of the West Carolina classification (that is, she lives in West Carolina). Reader 104 may thus need to have available a separate EPID public key 114 for each possible permutation of the private key categorization (that is, each state) that might be presented, if only state-based grouping was available.

EPID private key 114B may, when signing a nonce, indicate that information 202 discloses a given city and state combination of Springfield, West Carolina. EPID public key 116B may verify that a signature made with EPID private key 116B was valid, and that the user of RFEPID device 102 is a member of the Springfield, West Carolina classification (that is, she lives in Springfield, West Carolina). Furthermore, EPID public key 118A may also verify that a signature made with EPID private key 116B was valid with respect to membership in the state category. Thus, the single signature from EPID private key 114B might match (and be verifiable by) multiple EPID public keys—specifically, EPID public key 116A and EPID public key 116B. If reader 104 uses EPID public key 116A (West Carolina) to match EPID public key 114B (Springfield, West Carolina), then reader 104 might only determine that RFEPID device 102 is a member of the West Carolina categorization. If reader 104 uses EPID public key 116B (Springfield, West Carolina) to match EPID public key 114B (Springfield, West Carolina), the reader 104 might determine that RFEPID device 102 is a member of the Springfield, West Carolina categorization.

Accordingly, the public-private key pair for a plurality of classifications can be nested. An instance of EPID private key 114 might have a 1:N signing relationship to instances of EPID public keys 116. Moreover, a reader 104 might be able to carry a reduced number of public keys for the nested group of categorizations, depending upon the needs of the application that reader 104 is performed. Meanwhile, in some cases RFEPID device 102 might be able to carry a single private key for the nested group of categorizations, as it may rely upon reader 104 to carry an appropriate public key to verify the level of information that it requires. In order to maintain greater flexibility and discretion of signing with respect to levels of disclosed information, RFEPID device 102 may nonetheless carry multiple public keys for the nested categories. However, as discussed above, RFEPID device 102 may include a nested key (e.g., WC-or-PC) that may sign verifiers from reader 104 according to "WC-or-PC" requests, "WC" requests, or "PC" requests. However, signing a subgroup may be optionally performed according to whether signing would reveal too much information about membership of RFEPID device 102 or its users.

The identification of membership in different groups may form characteristic information. Thus, membership in nested or composite groups according to some hierarchical decomposition (or composition) may yield characteristic information. Different characteristics and composite groups may be named so that they form an EPID basename in a signing request, wherein an agreement to sign using such a basename acknowledges membership in the named group. Furthermore, the signature key of the basename may be the same private key when signing using different basename values that are components of the larger group.

Similarly, EPID private key 114C may, when signing a nonce, indicate that information 202 discloses US residency. EPID public key 116C may verify that a signature made with EPID private key 116C was valid, and that the user of RFEPID device 102 is a member of the US residency classification. Furthermore, the US residency classification may be nested among the city and city and state categories, such that any membership in West Carolina or Springfield, West Carolina denotes membership in the US residency classification. Thus, EPID public key 116C might be used to verify a signature of EPID private key 114A or EPID private key 114B, but would only yield information of membership in the US residency classification.

EPID private key 114D may, when signing a nonce, indicate that information 202 discloses membership in a pre-check classification. EPID public key 116D may verify that a signature made with EPID private key 114D was valid, and that the user of RFEPID device 102 is a member of the pre-check group. The pre-check group might not have any inherent relationships with other information and might not be nested. Reader 104 might require public keys for any such group designation that will be required in its application EPID private key 114E may, when signing a nonce, indicate that information 202 discloses membership in a certain, high level of an airline affinity club. EPID public key 116E may verify that a signature made with EPID private key 114E was valid, and that the user of RFEPID device 102 is a member of the certain, high level of an airline affinity club. Reader 104 might require public keys for any such level of club membership that will be required to be identified in its application.

EPID private key 114F may, when signing a nonce, indicate that information 202 discloses membership (at any level) an airline affinity club. EPID public key 116F may verify that a signature made with EPID private key 114F was valid, and that the user of RFEPID device 102 is a member of the airline affinity club.

Furthermore, the EPID private keys 114E, 114F may be nested, in that all members of the high level of the airline affinity club classification (as designated by EPID private key 114E) are also members of the general group (as would otherwise be designated by EPID private key 114F). Accordingly, EPID public key 116F may be successfully applied to a signature by EPID private key 114E, but will only yield information that RFEPID device 102 is related to the airline affinity club in general.

An instance of reader 104 trying to access the above example information 202 might allow access to an airline lounge if RFEPID device 102 returned a nonce signed with EPID private key 114E or EPID private key 114F. Thus, reader 104 might determine, from the signature of the nonce, whether RFEPID device 102 denotes membership in any level of membership in the affinity club. Thus, RFEPID device 102 might be used for physical access to such a location by touching the device to reader 104. Authentication might result in allowing a turnstile or door to open.

In another use case, an instance of reader 104 trying to access the above example information 202 to a wireless router in such an airline lounge if RFEPID device 102 returned a nonce signed with EPID private key 114E, but not if the nonce was signed with EPID private key 114F. Thus, reader 104 may use signature verification to identify a level of membership among those nested in classifications in the affinity club. RFEPID device 102 might be used to unlock electronic access to the router based upon authentication.

In yet another use case, an instance of reader 104 allowing admittance to an expedited line might allow RFEPID devices 102 to access the line (through, for example a turnstile, or indicator to security personnel) if the RFEPID device 102 returns a nonce signed with EPID private key 114E or EPID private key 114D. These would denote that the RFEPID device is an authorized credential for classification as pre-check or a heightened status of airline affinity club membership.

In the above use cases, information such as name, passport number, or pre-check status might not be disclosed through the signing of the nonce by RFEPID device 102. Thus, although "Jane Doe" with passport number "1111111" might be identified by the government or the airline through her name and passport number for pre-check and affinity club status, such information need not even be shared between RFEPID device 102 and reader 104. Unique identifiers, sensitive information, and other data need not even be shared.

In one embodiment, if information requested by reader 104 is not available, or the request looks suspicious to RFEPID device 102 (such as an identifier of reader 104 not matching the expected information request), then RFEPID device 102 might simply not respond with a signature of any kind. Accordingly, RFEPID device 102 may secure itself with only signing information in certain situations. For example, an RFEPID device 102 primarily configured as a travel document might simply not respond to a point-of-sale reader at a coffee shop, where there is no relevant data that can be provided by the device.

In one embodiment, if the information requested by reader 104 can be addressed with an EPID private key 114 that conveys less information than another EPID private key, RFEPID device 102 may sign the nonce using the EPID private key 114 that conveys less information. For example, if reader 104 polls RFEPID device 102 asking for verification of US residency, RFEPID device 102 might sign the nonce using EPID private key 114C, rather than EPID private key 114B or EPID private key 114A, as EPID private key 114C will only disclose membership in the category of US residency and cannot be used to denote membership in West Carolina or Springfield, West Carolina classifications.

However, in another embodiment, space may be saved on RFEPID device 102 by having an instance of EPID private key 114 sign nonces to indicate membership in multiple groups. For example, consider an EPID private key 114 instance to denote both pre-check status and elevated membership in the affinity club. Such an EPID private key 114 would sign nonces from reader 104 for requests for both classifications. The associated EPID public key 116 for either classification would authorize such a signature. Depending upon the implementation of RFEPID device 102, space for private keys may be expensive, such as cases where RFEPID device 102 is implemented as a low-power wearable device.

The information contained within RFEPID device 102 may be selectively signed by an appropriate EPID private key 114 among the multiple private keys stored therein. The RFEPID device 102 may sign a nonce from a reader 104 with different EPID private keys 114 depending upon the situation and the nature of reader 104 and the transaction that is occurring.

Security of RFEPID device 102 may be enhanced over other implementations of EPID schemes because the credentials of RFEPID device 102 are inherently present at a transaction requiring reader 104. By utilizing RFID, RFEPID device 102 requires that the user be present for the authorization. For example, RFEPID device 102 may include a photo identification visually displayed. A sales clerk, government agent, computer, or other entity verifying credentials may compare a user's face to the photo identification provided by RFEPID device 102. In addition, reader 104 will authenticate classifications purported by RFEPID device 102 through checking signatures as discussed above. Thus, sensitive information such as unique identifiers need not be disclosed but nonetheless may be securely authenticated.

In some embodiments, a user of RFEPID device 102 may be prompted to select which of several possible authorizations may be made. Thus, RFEPID device 102 may allow users to evaluate the risk of disclosing additional information that might be gathered by use of different public EPID keys on the signed nonce that is returned from RFEPID device 102.

Other membership classifications could include citizenship of specific countries, military status, police status, diplomatic status, refugee, criminal background, make or model information, machine features, software versions, warranty status, global-entry status, frequent flyer status, demographics, etc. Membership classifications can be used in negative logic fashion, where non-membership of other groups may be specified.

Figure 3:
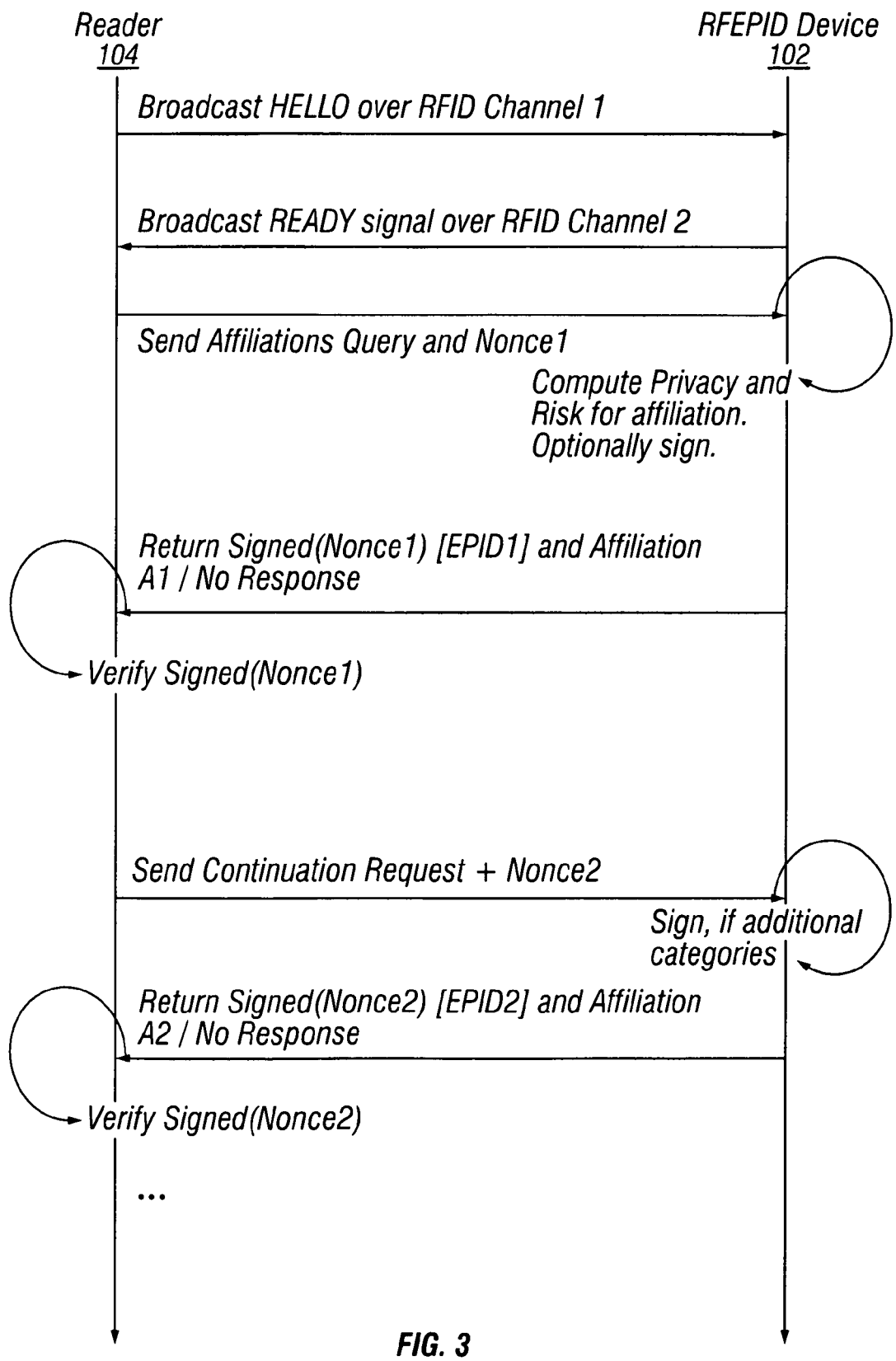
FIG. 3 is an illustration of rules used by a monitor module to determine self-regulation of operations.

FIG. 3 is an illustration of example communication between RFEPID device 102 and reader 104, in accordance with embodiments of the present disclosure.

Reader 104 may come into close proximity with RFEPID device 102. Reader 102 may broadcast a HELLO message over RFID channel 1. The proximity to reader 104 may power RFEPID device 102 and its circuits.

In response to the HELLO message, RFEPID device 102 may broadcast a READY signal over RFID channel 2.

Reader 104 may receive the READY signal. In response, reader 104 may assemble an affiliations query specifying what information reader 104 can accept or is looking to verify. Reader 104 may indicate the use or purpose of the information request. Furthermore, reader 104 may establish its own credentials or identity. Reader 104 may also generate a first nonce value from a random number, or otherwise create a transaction identifier. Reader 104 may broadcast or send the affiliations query and nonce to RFEPID device 102.

RFEPID device 102 may determine whether or not it will respond to the query. Such a determination may be made, for example, upon risk or security concerns, whether it has the desired information, and what level of information will be provided. The affiliations may specify different categories, groups, or other affiliations that may be accepted by reader 104. RFEPID device 102 may select which, if any, groups, categories, or affiliations for which it will provide membership information. RFEPID device 102 may sign the first nonce for a first such membership, or it may refuse to sign. RFEPID device 102 may select an appropriate private key associated with the membership information that will be conveyed.

RFEPID device 102 may send the signed first nonce (signed according the selected private key), as well as an indicator for what affiliation the nonce was signed. In some cases, RFEPID device 102 might not provide a response, and the exchange between reader 104 and RFEPID device 102 may end or time-out.

Reader 104 may select a public key according to the indicated affiliation. Reader 104 may use the public key to verify the signed nonce. If the signed nonce is validated, then an appropriate action may be taken by reader 104 or a device connected to reader 104. Otherwise, corrective action may be taken, or a requested operation may be denied.

Reader 104 may optionally send additional requests as continuations, as well as additionally generated nonces so as to capture additional membership information. Reader 104 may send as many additional requests as is needed to complete its tasks, for which signatures will be made by RFEPID device 102.

RFEPID device 102 may sign the additional nonces if there are additional categories of membership to be conveyed to reader 104. RFEPID device 102 may return the signed nonces, signed with other private keys corresponding to the communicated membership, as well as indicators of affiliation. In some cases, RFEPID device 102 might simply not respond so as to indicate that no additional membership information will be conveyed.

Figure 4:
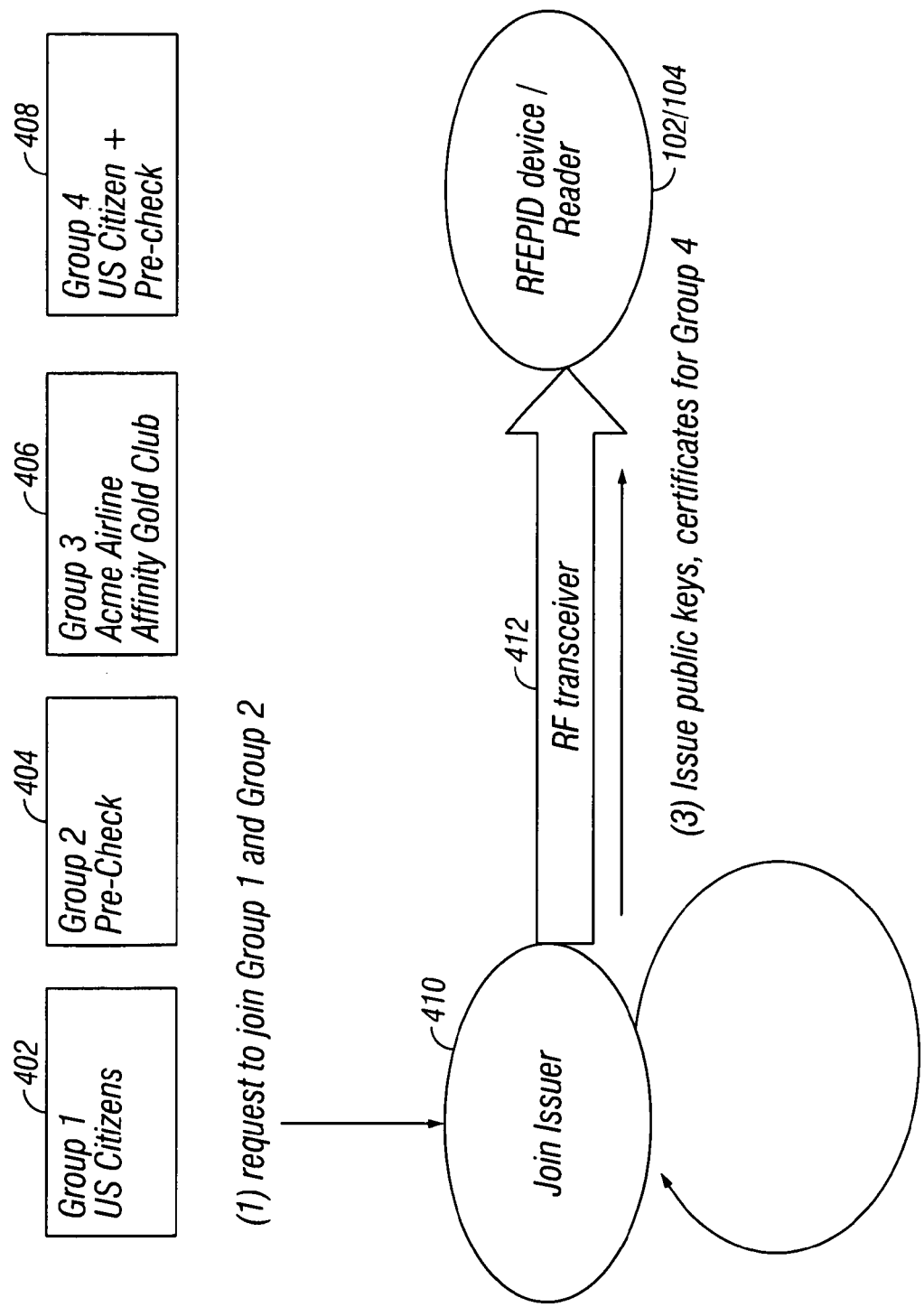
FIG. 4 is an illustration of creation of a multi-member group for device usage, according to embodiments of the present disclosure

FIG. 4 illustrates example operation of creation of a multi-member group for RFEPID device 102 usage, according to embodiments of the present disclosure.

Example groups may include those similar to the groups discussed in conjunction with FIG. 2. Group 1 402 may be an RFEPID-based membership classification for US citizenship. Group 2 404 may be an RFEPID-based membership classification for pre-check. Group 3 406 may be an RFEPID-based membership classification for an airline affinity club membership level. Group 4 408 may be an RFEPID-based membership classification for a combination of both pre-check and US citizenship, denoting membership in both Group 1 402 and Group 2 404.

RFEPID device 102 might more efficiently use a private key that indicates group 4 408, as opposed to separate keys for group 1 402 and group 2 404. Accordingly, in one embodiment during initialization of RFEPID device 102, RFEPID device 102 may recognize that RFEPID device 102 is to provide credentials of both group 1 402 and group 2 404, and may request creation of group 4 408. In other embodiments, RFEPID device 102 may be identified as a beneficiary of such a group, and group 4 408 may be created from an identification made elsewhere.

At (1), a join issuer 410 may receive the request to join group 1 402 and group 2 404. Join issuer 410 may be implemented by instructions, circuitry, programmable logic, or other suitable mechanisms and may be accessible by creators or administrators of RFEPID device. Join issuer 410 may reside on a key server or other configuration machine.

At (2), join issuer 410 may create public keys based upon group 1 402 and group 2 404, resulting in a public key for group 4 408.

At (3), join issuer 410 may write public keys and their associated affiliate information to RFEPID device 102 or reader 104 through any suitable mechanism, such as through an RF transceiver 412, local bus, or other communication protocol. Furthermore, join issuer 410 may issue certificates for group 4 408.

Figure 5:
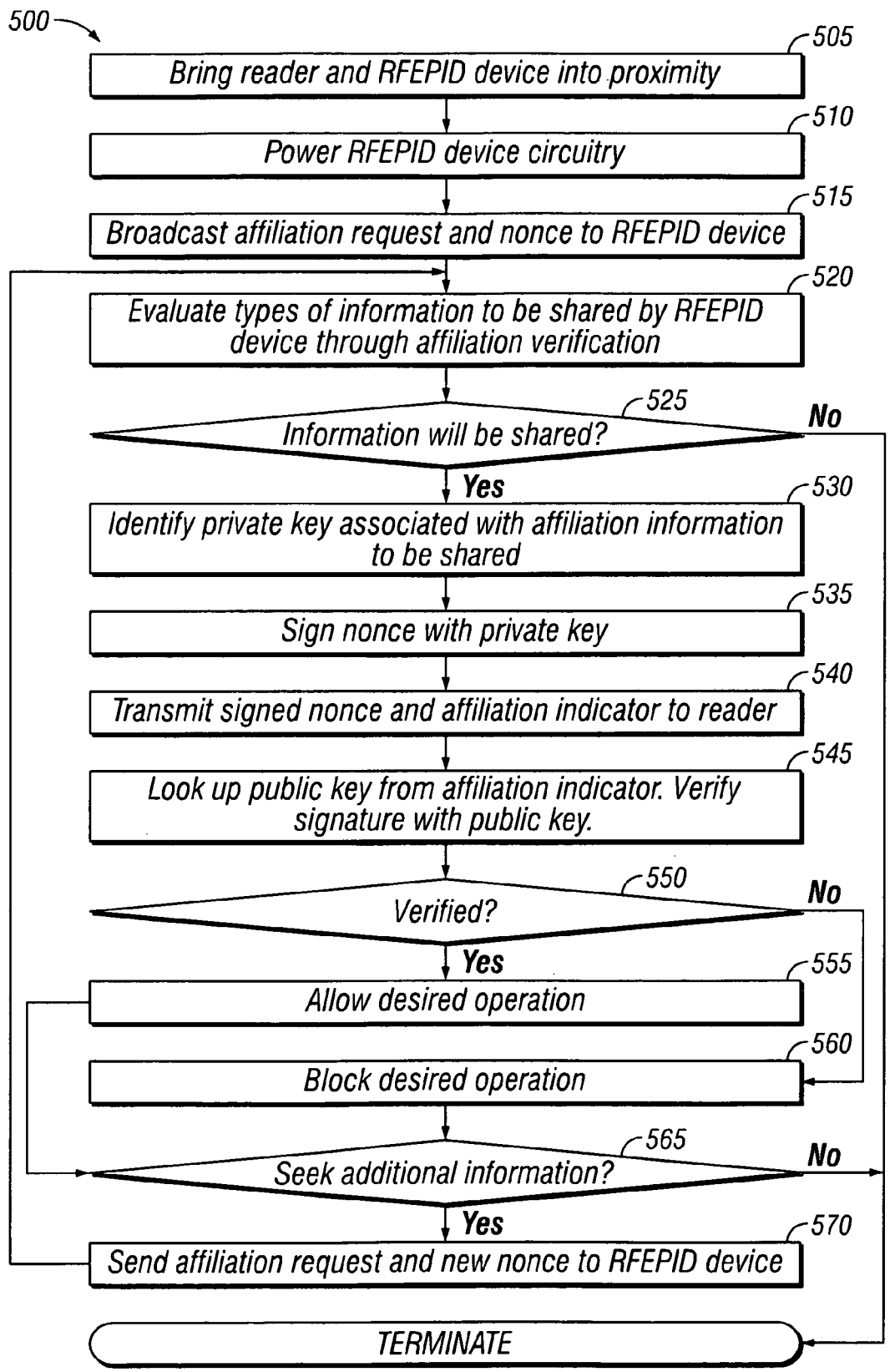
FIG. 5 is an illustration of an example embodiment of a method for peer-aware self-regulation for virtualized environment.

FIG. 5 is an illustration of an example embodiment of a method 500 for EPID attestation, in accordance with embodiments of the present disclosure. Method 500 may be initiated by any suitable criteria. Method 500 may be implemented using the system of FIGS. 1-4 or any other system operable to implement method 500. As such, the preferred initialization point for method 500 and the order of the elements comprising method 500 may depend on the implementation chosen. In some embodiments, some elements may be optionally omitted, repeated, or combined. In certain embodiments, method 500 may be implemented partially or fully in software embodied in computer-readable media, circuitry, or programmable logic.

At 505, a reader and a RFEPID device may come into close proximity, sufficient to establish a wireless communication link such as RFID or NFC.

At 510, circuitry on the RFEPID device may be powered through induction or other wireless means from the proximity to the reader.

At 515, the reader may issue or broadcast an initial greeting to the RFEPID device. The greeting may identify the reader. Furthermore, the greeting may identify information that is required from RFEPID device, or types of information that might be available on RFEPID device that may be used by the reader. The information may be defined in terms of group membership, affiliation, or categorizations. The greeting may include a nonce value.

At 520, the RFEPID device may evaluate whether it has information that can be used by the reader. Furthermore, the RFEPID device may evaluate whether the reader is trustworthy to share the information. Also, the RFEPID device may identify desired tasks to be performed, and the information needed for such tasks. In addition, the RFEPID device may identify an appropriate level of nested information to share to fulfill the goals.

At 525, the RFEPID device may determine whether or not to share any information. If not, method 500 may terminate or optionally repeat. If so, at 530 a private key may be identified, wherein the private key is associated with the affiliation information to be shared. At 535, the nonce may be signed with the identified private key. At 540, the signed nonce and an identifier of the affiliation may be sent to the reader.

At 545, the identifier of the affiliation may be used to look up a certificate and public key for the affiliation information. The public key may be used to verify the signature of the nonce. At 550, it may be determined whether verification was successful. If the signature was not verified, method 500 may proceed to 560. If the signature was verified, method 500 may proceed to 555.

At 555, a desired operation associated with the affiliation information may be allowed or performed. At 560, the desired operation may be blocked or corrective measures taken.

At 565, it may be determined whether additional affiliation information can be used and will be sought from the RFEPID device. If not, method 500 may optionally repeat or terminate. If so, at 570 an affiliation request and a newly generated nonce may be sent to the RFEPID device. Method 500 may repeat at, for example, 520 to evaluate the new request and nonce.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

The following examples pertain to further embodiments. Specifics in the examples may be used anywhere in one or more embodiments described above or herein.

In some embodiments, an apparatus includes a storage. The storage may include a plurality of private keys. Each private key may be associated with a group affiliation. The storage may include a plurality of characteristic information. The apparatus may include a wireless interface configured to receive a request from a reader for verification of membership of the apparatus within one of the group affiliations. The apparatus may include a controller including programmable logic for configuring the controller. The controller may be configured to determine whether to verify membership of the apparatus within a first group affiliation, verify membership of the apparatus within the first group affiliation by signing data with a first private key (the first private key associated with the first group affiliation), and send the signed data to the reader. Membership within the first group affiliation may be configured to convey a subset of the characteristic information. In combination with any of the above embodiments, the wireless interface is further configured to receive an additional request from the reader for verification of membership of the apparatus within another one of the group affiliations. In combination with any of the above embodiments, the controller is configured to determine whether to verify membership of the apparatus within any second group affiliations. In combination with any of the above embodiments, the controller is configured to ignore the additional request based upon a determination that the apparatus is not a member of any second group affiliations to be reported to the reader. In combination with any of the above embodiments, the signed data is configured to be verified by a public key. In combination with any of the above embodiments, the public key is a counterpart to the first private key. In combination with any of the above embodiments, the public key is configured to verify a plurality of private keys configured to denote membership in the first group affiliation. In combination with any of the above embodiments, the first private key is unique to the apparatus. In combination with any of the above embodiments, membership in the first group affiliation is verifiable by the first private key and by a second private key, the first private key different from the second private key. In combination with any of the above embodiments, signing the data with the first private key verifies membership of the apparatus within the first group affiliation and in a second group affiliation. In combination with any of the above embodiments, the first group affiliation is a subset of the second group affiliation. In combination with any of the above embodiments, the signed data is configured to be verified by a public key. In combination with any of the above embodiments, the public key is a counterpart to the first private key. In combination with any of the above embodiments, the public key is configured to verify that the signed data correctly identifies membership in the first group affiliation. In combination with any of the above embodiments, the signed data is further configured to be verified by a second public key. In combination with any of the above embodiments, the second public key is configured to verify that the signed data correctly identifies membership in the second group affiliation. In combination with any of the above embodiments, the data is received from the reader and includes a nonce. In combination with any of the above embodiments, the controller is further configured to refuse verification of membership of the apparatus within any group affiliation based on a determination that the request does not match available characteristic information. In combination with any of the above embodiments, the controller is further configured to refuse verification of membership of the apparatus within any group affiliation based on a security evaluation of the reader. In combination with any of the above embodiments, the controller is configured to identify the first private key from the plurality of private keys based upon a determination to share the subset of the characteristic information with the reader. In combination with any of the above embodiments, the wireless interface includes a radio-frequency identification (RFID) circuit. In combination with any of the above embodiments, the private keys are Enhanced Privacy Identification (EPID) keys. In combination with any of the above embodiments, the programmable logic of the controller is embodied in instructions in a memory for execution by a processor. In combination with any of the above embodiments, the programmable logic of the controller is embodied in an Application-Specific Integrated Circuit (ASIC).

Embodiments of the present disclosure include at least one non-transitory machine-readable medium, comprising instructions for execution on a processor, the instructions, when loaded and executed by the processor, cause the processor to receive a request from a reader through a wireless interface. In combination with any of the above embodiments, the request is for verification of membership of an apparatus within one of a plurality of group affiliations. In combination with any of the above embodiments, each group affiliation is associated with a different stored private key. In combination with any of the above embodiments, the apparatus includes a plurality of characteristic information. In combination with any of the above embodiments, the processor is caused to determine whether to verify membership of the apparatus within a first group affiliation, verify membership of the apparatus within the first group affiliation by signing data with a first private key, the first private key associated with the first group affiliation, and send the signed data to the reader. Membership within the first group affiliation is configured to convey a subset of the characteristic information. In combination with any of the above embodiments, the processor is further caused to receive an additional request from the reader for verification of membership of the apparatus within another one of the group affiliations, determine whether to verify membership of the apparatus within any second group affiliations, and ignore the additional request based upon a determination that the apparatus is not a member of any second group affiliations to be reported to the reader. In combination with any of the above embodiments, the signed data is configured to be verified by a public key, the public key a counterpart to the first private key. In combination with any of the above embodiments, the public key is configured to verify a plurality of private keys configured to denote membership in the first group affiliation. In combination with any of the above embodiments, the first private key is unique to the apparatus. In combination with any of the above embodiments, membership in the first group affiliation is verifiable by the first private key and by a second private key, the first private key different from the second private key. In combination with any of the above embodiments, signing the data with the first private key verifies membership of the apparatus within the first group affiliation and in a second group affiliation. In combination with any of the above embodiments, signing the data with the first private key verifies membership of the apparatus within the first group affiliation and in a second group affiliation. In combination with any of the above embodiments, the first group affiliation is a subset of the second group affiliation. In combination with any of the above embodiments, the signed data is configured to be verified by a public key, the public key a counterpart to the first private key. In combination with any of the above embodiments, the public key is configured to verify that the signed data correctly identifies membership in the first group affiliation. In combination with any of the above embodiments, the signed data is further configured to be verified by a second public key. In combination with any of the above embodiments, the second public key is configured to verify that the signed data correctly identifies membership in the second group affiliation. In combination with any of the above embodiments, the data includes a nonce. In combination with any of the above embodiments, the processor is further caused to refuse verification of membership of the apparatus within any group affiliation based on a determination that the request does not match available characteristic information. In combination with any of the above embodiments, the processor is further caused to refuse verification of membership of the apparatus within any group affiliation based on a security evaluation of the reader. In combination with any of the above embodiments, the processor is further caused to identify the first private key from the plurality of private keys based upon a determination to share the subset of the characteristic information with the reader. In combination with any of the above embodiments, the wireless interface includes a radio-frequency identification (RFID) circuit. In combination with any of the above embodiments, the private keys are Enhanced Privacy Identification (EPID) keys.

In embodiments of the present disclosure, a method of verification includes receiving a request from a reader through a wireless interface. In combination with any of the above embodiments, the request is for verification of membership of an apparatus within one of a plurality of group affiliations. In combination with any of the above embodiments, each group affiliation is associated with a different stored private key. In combination with any of the above embodiments, the apparatus includes a plurality of characteristic information. In combination with any of the above embodiments, the method includes determining whether to verify membership of the apparatus within a first group affiliation, verifying membership of the apparatus within the first group affiliation by signing data with a first private key, the first private key associated with the first group affiliation, and sending the signed data to the reader. In combination with any of the above embodiments, membership within the first group affiliation conveys a subset of the characteristic information. In combination with any of the above embodiments, the method further includes receiving an additional request from the reader for verification of membership of the apparatus within another one of the group affiliations, determining whether to verify membership of the apparatus within any second group affiliations, and ignoring the additional request based upon a determination that the apparatus is not a member of any second group affiliations to be reported to the reader. In combination with any of the above embodiments, the signed data is verifiable by a public key, the public key a counterpart to the first private key. In combination with any of the above embodiments, the public key is configured to verify a plurality of private keys configured to denote membership in the first group affiliation. In combination with any of the above embodiments, the first private key is unique to the apparatus. In combination with any of the above embodiments, membership in the first group affiliation is verifiable by the first private key and by a second private key, the first private key different from the second private key. In combination with any of the above embodiments, signing the data with the first private key verifies membership of the apparatus within the first group affiliation and in a second group affiliation. In combination with any of the above embodiments, the first group affiliation is a subset of the second group affiliation. In combination with any of the above embodiments, the signed data is configured to be verified by a public key, the public key a counterpart to the first private key. In combination with any of the above embodiments, the public key is configured to verify that the signed data correctly identifies membership in the first group affiliation. In combination with any of the above embodiments, the signed data is further configured to be verified by a second public key. In combination with any of the above embodiments, the second public key is configured to verify that the signed data correctly identifies membership in the second group affiliation. In combination with any of the above embodiments, the data is received from the reader and includes a nonce. In combination with any of the above embodiments, the method includes refusing verification of membership of the apparatus within any group affiliation based on a determination that the request does not match available characteristic information. In combination with any of the above embodiments, the method includes refusing verification of membership of the apparatus within any group affiliation based on a security evaluation of the reader. In combination with any of the above embodiments, the method includes identifying the first private key from the plurality of private keys based upon a determination to share the subset of the characteristic information with the reader. In combination with any of the above embodiments, the wireless interface includes a radio-frequency identification (RFID) circuit. In combination with any of the above embodiments, the private keys are Enhanced Privacy Identification (EPID) keys.

In embodiments of the present disclosure, an apparatus includes means for receiving a request from a reader through a wireless interface. In combination with any of the above embodiments, the request is for verification of membership of a device within one of a plurality of group affiliations. In combination with any of the above embodiments, each group affiliation is associated with a different stored private key. In combination with any of the above embodiments, the device includes a plurality of characteristic information. In combination with any of the above embodiments, the apparatus includes means for determining whether to verify membership of the device within a first group affiliation, means for verifying membership of the device within the first group affiliation by means for signing data with a first private key, the first private key associated with the first group affiliation, and means for sending the signed data to the reader. In combination with any of the above embodiments, membership within the first group affiliation conveys a subset of the characteristic information. In combination with any of the above embodiments, the method further includes means for receiving an additional request from the reader for verification of membership of the device within another one of the group affiliations, means for determining whether to verify membership of the device within any second group affiliations, and means for ignoring the additional request based upon a determination that the device is not a member of any second group affiliations to be reported to the reader. In combination with any of the above embodiments, the signed data is verifiable by a public key, the public key a counterpart to the first private key. In combination with any of the above embodiments, the public key is configured to verify a plurality of private keys configured to denote membership in the first group affiliation. In combination with any of the above embodiments, the first private key is unique to the device. In combination with any of the above embodiments, membership in the first group affiliation is verifiable by the first private key and by a second private key, the first private key different from the second private key. In combination with any of the above embodiments, means for signing the data with the first private key verifies membership of the device within the first group affiliation and in a second group affiliation. In combination with any of the above embodiments, the first group affiliation is a subset of the second group affiliation. In combination with any of the above embodiments, the signed data is configured to be verified by a public key, the public key a counterpart to the first private key. In combination with any of the above embodiments, the public key is configured to verify that the signed data correctly identifies membership in the first group affiliation. In combination with any of the above embodiments, the signed data is further configured to be verified by a second public key. In combination with any of the above embodiments, the second public key is configured to verify that the signed data correctly identifies membership in the second group affiliation. In combination with any of the above embodiments, the data is received from the reader and includes a nonce. In combination with any of the above embodiments, the apparatus includes means for refusing verification of membership of the device within any group affiliation based on a determination that the request does not match available characteristic information. In combination with any of the above embodiments, the apparatus includes means for refusing verification of membership of the device within any group affiliation based on a security evaluation of the reader. In combination with any of the above embodiments, the apparatus includes means for identifying the first private key from the plurality of private keys based upon a determination to share the subset of the characteristic information with the reader. In combination with any of the above embodiments, the wireless interface includes a radio-frequency identification (RFID) circuit. In combination with any of the above embodiments, the private keys are Enhanced Privacy Identification (EPID) keys.

In embodiments of the present disclosure, an apparatus includes a processor, a memory including a plurality of public keys, a wireless interface, and a controller. Each public key is associated with a group affiliation. The interface is configured to send a request to a device and receive signed data and an affiliation identifier from the device. The request is for verification of membership of the device within one of the group affiliations. The controller including instructions resident within the memory for execution by the processor, the instructions, when executed by the processor, configure the controller to identify a first public key from the plurality of public keys from the affiliation identifier, verify a signature of the data using the first public key, identify a first group affiliation based upon verification with the first public key, derive a subset of characteristic information available about the device based upon the identified first group affiliation, and authorize or refuse action on behalf of the device based upon the subset of characteristic information of the device. In combination with any of the above embodiments, the wireless interface is further configured to send an additional request for verification of the device within another one of the group affiliations and receive additional signed data and an additional affiliation identifier from the device. In combination with any of the above embodiments, the controller is further configured to identify a second public key from the plurality of public keys from the additional affiliation identifier, verify a signature of the additional data using the second public key, identify a second group affiliation based upon verification with the second public key, derive an additional subset of characteristic information available about the device based upon the identified second group affiliation, authorize or refuse action on behalf of the device further based upon the additional subset of characteristic information of the device. In combination with any of the above embodiments, the first public key is a counterpart to a plurality of different private keys, each private key configured to denote membership in the first group affiliation. In combination with any of the above embodiments, the data was signed with a private key unique to the device. In combination with any of the above embodiments, membership in the first group affiliation is verifiable by the first public key and by a second public key, the first public key different from the second public key. In combination with any of the above embodiments, the controller is further configured to generate the data as a nonce and transmit the data to the device with the request. In combination with any of the above embodiments, the wireless interface includes a radio-frequency identification (RFID) circuit. In combination with any of the above embodiments, the public keys are Enhanced Privacy Identification (EPID) keys.

Embodiments of the present disclosure include at least one non-transitory machine-readable medium comprising instructions, the instructions readable by a processor, the instructions, when loaded and executed, cause the processor to send a request to a device. The request is for verification of membership of the device within one of a plurality of group affiliations. The processor is further caused to receive signed data and an affiliation identifier from the device, identify from the affiliation identifier a first public key from a plurality of public keys (each public key associated with a group affiliation), verify a signature of the data using the first public key, identify a first group affiliation based upon verification with the first public key, derive a subset of characteristic information available about the device based upon the identified first group affiliation, and authorize or refuse action on behalf of the device based upon the subset of characteristic information of the device. In combination with any of the above embodiments, the processor is further caused to send an additional request for verification of the device within another one of the group affiliations, receive additional signed data and an additional affiliation identifier from the device, and identify from the additional affiliation identifier a second public key from the plurality of public keys. In combination with any of the above embodiments, the controller is further caused to verify a signature of the additional data using the second public key, identify a second group affiliation based upon verification with the second public key, derive an additional subset of characteristic information available about the device based upon the identified second group affiliation, and authorize or refuse action on behalf of the device further based upon the additional subset of characteristic information of the device. In combination with any of the above embodiments, the first public key is a counterpart to a plurality of different private keys. In combination with any of the above embodiments, each private key is configured to denote membership in the first group affiliation. In combination with any of the above embodiments, the data was signed with a private key unique to the device. In combination with any of the above embodiments, membership in the first group affiliation is verifiable by the first public key and by a second public key, the first public key different from the second public key. In combination with any of the above embodiments, the processor is further caused to generate the data as a nonce and transmit the data to the device with the request. In combination with any of the above embodiments, the wireless interface includes a radio-frequency identification (RFID) circuit. In combination with any of the above embodiments, the public keys are Enhanced Privacy Identification (EPID) keys.

A method of verification includes sending a request to a device, the request for verification of membership of the device within one of a plurality of group affiliations, receiving signed data and an affiliation identifier from the device, identifying from the affiliation identifier a first public key from a plurality of public keys (each public key associated with a group affiliation), verifying a signature of the data using the first public key, identifying a first group affiliation based upon verification with the first public key, deriving a subset of characteristic information available about the device based upon the identified first group affiliation, and authorizing or refusing action on behalf of the device based upon the subset of characteristic information of the device. In combination with any of the above embodiments, the method further includes sending an additional request for verification of the device within another one of the group affiliations, receiving additional signed data and an additional affiliation identifier from the device, and identifying from the additional affiliation identifier a second public key from the plurality of public keys. The method also includes verifying a signature of the additional data using the second public key, identifying a second group affiliation based upon verification with the second public key, deriving an additional subset of characteristic information available about the device based upon the identified second group affiliation, and authorizing or refusing action on behalf of the device further based upon the additional subset of characteristic information of the device. In combination with any of the above embodiments, the first public key is a counterpart to a plurality of different private keys, each private key configured to denote membership in the first group affiliation. In combination with any of the above embodiments, the data was signed with a private key unique to the device. In combination with any of the above embodiments, membership in the first group affiliation is verifiable by the first public key and by a second public key, the first public key different from the second public key. In combination with any of the above embodiments, the method further includes generating the data as a nonce and transmitting the data to the device with the request. In combination with any of the above embodiments, the wireless interface includes a radio-frequency identification (RFID) circuit. In combination with any of the above embodiments, the public keys are Enhanced Privacy Identification (EPID) keys.

An apparatus includes apparatus of verification includes means for sending a request to a device, the request for verification of membership of the device within one of a plurality of group affiliations, means for receiving signed data and an affiliation identifier from the device, identifying from the affiliation identifier a first public key from a plurality of public keys (each public key associated with a group affiliation), means for verifying a signature of the data using the first public key, means for identifying a first group affiliation based upon verification with the first public key, means for deriving a subset of characteristic information available about the device based upon the identified first group affiliation, and means for authorizing or refusing action on behalf of the device based upon the subset of characteristic information of the device. In combination with any of the above embodiments, the apparatus further includes means for sending an additional request for verification of the device within another one of the group affiliations, means for receiving additional signed data and an additional affiliation identifier from the device, and means for identifying from the additional affiliation identifier a second public key from the plurality of public keys. The apparatus also includes means for verifying a signature of the additional data using the second public key, means for identifying a second group affiliation based upon verification with the second public key, means for deriving an additional subset of characteristic information available about the device based upon the identified second group affiliation, and means for authorizing or refusing action on behalf of the device further based upon the additional subset of characteristic information of the device. In combination with any of the above embodiments, the first public key is a counterpart to a plurality of different private keys, each private key configured to denote membership in the first group affiliation. In combination with any of the above embodiments, the data was signed with a private key unique to the device. In combination with any of the above embodiments, membership in the first group affiliation is verifiable by the first public key and by a second public key, the first public key different from the second public key. In combination with any of the above embodiments, the apparatus further includes means for generating the data as a nonce and means for transmitting the data to the device with the request. In combination with any of the above embodiments, the wireless interface includes a radio-frequency identification (RFID) circuit. In combination with any of the above embodiments, the public keys are Enhanced Privacy Identification (EPID) keys.

Specifics in the examples above may be used anywhere in one or more embodiments.

Although the present disclosure has been described in detail, it should be understood that various changes, substitutions, and alterations can be made hereto without departing from the spirit and the scope of the disclosure as defined by the appended claims.

What is claimed is:

1. An apparatus, comprising:
    a storage including:
        a plurality of private keys, each private key associated with a respective group affiliation of which the apparatus is a member; and
        a plurality of characteristic information associated with the apparatus;
    a wireless interface configured to receive a request from a reader for verification of membership of the apparatus within one of the group affiliations; and
    a controller including programmable logic for configuring the controller to:
        determine whether to verify membership of the apparatus within a first group affiliation;
        verify membership of the apparatus within the first group affiliation by signing data with a first private key, the first private key associated with the first group affiliation, wherein membership within the first group affiliation is configured to convey a subset of the characteristic information; and
        send the signed data to the reader.

2. The apparatus of claim 1, wherein:
    the wireless interface is further configured to receive an additional request from the reader for verification of membership of the apparatus within another one of the group affiliations; and
    the controller is further configured to:
        determine whether to verify membership of the apparatus within any second group affiliations; and
        ignore the additional request based upon a determination that the apparatus is not a member of any second group affiliations to be reported to the reader.

3. The apparatus of claim 1, wherein:
    the signed data is configured to be verified by a public key, the public key a counterpart to the first private key; and
    the public key is configured to verify a plurality of private keys configured to denote membership in the first group affiliation by respective members of the first group affiliation.

4. The apparatus of claim 1, wherein the first private key is unique to the apparatus.

5. The apparatus of claim 1, wherein membership in the first group affiliation is verifiable by the first private key and by a second private key, the first private key different from the second private key.

6. The apparatus of claim 1, wherein:
    signing the data with the first private key verifies membership of the apparatus within the first group affiliation and in a second group affiliation;
    the first group affiliation is a subset of the second group affiliation;
    the signed data is configured to be verified by a public key, the public key a counterpart to the first private key; and
    the public key is configured to verify that the signed data correctly identifies membership in the first group affiliation.

7. The apparatus of claim 1, wherein:
    signing the data with the first private key verifies membership of the apparatus within the first group affiliation and in a second group affiliation;
    the first group affiliation is a subset of the second group affiliation;
    the signed data is configured to be verified by a first public key, the first public key a counterpart to the first private key;
    the first public key is configured to verify the signed data correctly identifies membership in the first group affiliation;
    the signed data is further configured to be verified by a second public key; and
    the second public key is configured to verify that the signed data correctly identifies membership in the second group affiliation.

8. The apparatus of claim 1, wherein the controller is further configured to refuse to verify membership of the apparatus within any group affiliation based on a security evaluation of the reader.

9. The apparatus of claim 1, wherein the controller is configured to identify the first private key from the plurality of private keys based upon a determination to share the subset of the characteristic information with the reader.

10. The apparatus of claim 1, wherein the wireless interface includes a radio-frequency identification (RFID) circuit.

11. The apparatus of claim 1, wherein the private keys are Enhanced Privacy Identification (EPID) keys.

12. The apparatus of claim 1, wherein the programmable logic of the controller is embodied in one or more of:
    instructions in a memory for execution by a processor;
    an Application-Specific Integrated Circuit (ASIC); or
    a Field-Programmable Gate Array (FPGA).

13. At least one non-transitory machine-readable medium, comprising instructions for execution on a processor, the instructions, when loaded and executed by the processor, cause the processor to:

receive a request from a reader through a wireless interface, wherein:
  the request is for verification of membership of an apparatus within one of a plurality of group affiliations of which the apparatus is a member;
  the apparatus includes a plurality of characteristic information associated with the apparatus;
determine whether to verify membership of the apparatus within a first group affiliation;
verify membership of the apparatus within the first group affiliation by signing data with a first private key, the first private key associated with the first group affiliation; and
send the signed data to the reader;
wherein membership within the first group affiliation is configured to convey a subset of the characteristic information.

14. The medium of claim 13, wherein:
the signed data is configured to be verified by a public key, the public key a counterpart to the first private key; and
the public key is configured to verify a plurality of private keys configured to denote membership in the first group affiliation by respective members of the first group affiliation.

15. The medium of claim 13, wherein:
signing the data with the first private key verifies membership of the apparatus within the first group affiliation and in a second group affiliation;
the first group affiliation is a subset of the second group affiliation;
the signed data is configured to be verified by a first public key, the first public key a counterpart to the first private key;
the first public key is configured to verify the signed data correctly identifies membership in the first group affiliation;
the signed data is further configured to be verified by a second public key; and
the second public key is configured to verify that the signed data correctly identifies membership in the second group affiliation.

16. The medium of claim 13, further comprising instructions for causing the processor to identify the first private key from the plurality of private keys based upon a determination to share the subset of the characteristic information with the reader.

* * * * *